INVENTOR
JACOB R. PETERNEL

United States Patent Office 3,744,985
Patented July 10, 1973

3,744,985
METHOD AND APPARATUS FOR CONTROLLING TEMPERATURE OF CONVEYED GLASS SHEETS
Jacob R. Peternel, Pittsburgh, Pa., assignor to PPG Industries, Inc., Pittsburgh, Pa.
Filed June 8, 1971, Ser. No. 150,986
Int. Cl. C03b 23/02
U.S. Cl. 65—104         10 Claims

ABSTRACT OF THE DISCLOSURE

A novel arrangement for controlling the thermal gradient of glass sheets undergoing thermal processing where temperature is a critical feature of the operation such as in shaping, tempering, coating, and the like.

BACKGROUND OF THE INVENTION

Field of the invention

This invention relates to the control of the temperature of glass sheets undergoing mass production thermal processing. While the details of the illustrative embodiment to be described below relate to the control of glass sheet temperature in a vertical press bending process, it is readily understood that the temperature control technique described herein may be readily adapted for controlling the temperature of glass sheets leaving a furnace having a series of heating zones arranged in end to end relation at an elevated temperature necessary for further processing such as required for tempering, coating, and the like.

It has long been recognized that control of glass temperature is essential in the vertical press bending process. In the aforesaid process, a succession of glass sheets is conveyed through a tunnel-type furnace. The furnace is divided into a series of zones extending in end-to-end relation along its length. The glass sheets are supported in a vertical orientation, preferably by tongs that grip the glass sheets near their upper edge. The tongs are suspended from cars or carriages that are propelled along a track extending the entire length of the furnace and into a further processing station. Heating elements in the form of gas burners or electrical heating coils are arranged in opposed pairs of sets of heating elements to heat the moving glass sheets by irradiation. The heating elements in each zone have their heat input controlled to help each glass sheet arrive at the press bending station at its deformation temperature.

In the past, a standard installation on vertical press bending lines included an optical pyrometer located near the exit of the furnace and disposed in such a position that the center region of each glass sheet passed in the field of view of the pyrometer as each glass sheet in succession was conveyed toward the furnace exit. A recorder provided a visual record of the output signal at an operator's viewing station. In this manner, an operator had a visual record of the temperature of the center region of each glass sheet that passed through the furnace. After the operator had established suitable operating conditions to produce shaped glass sheets within the tolerances permitted by the customer, he manually adjusted certain controls to maintain constant temperature at the center region of each sheet whenever he observed the recorded temperature to depart significantly from the desired temperature.

When the operator observed that the center region temperature of the sheets was changing from a desired value, he had two alternative actions to take. He could adjust the speed of the conveyor or the power input to the furnace heating elements. Each of these adjustments available to the prior art was accompanied by undesirable side effects. If the operator adjusted the speed of the conveyor to restore a reduction of glass temperature, it was necessary to reduce the furnace output whenever it was necessary to increase the glass sheet temperature to re-obtain a desired temperature. If the operator adjusted the power input to the furnace heating elements, he frequently disturbed the balance of the heating process without realizing what he had done, because he had no indication of what an adjustment to the power input to restore the temperature in the central region of the glass sheets, for example, did to the top region temperatures or the bottom region temperatures of the glass sheets undergoing thermal processing.

It is desirable to monitor the glass temperature at the last possible moment before it is processed to insure that the successive glass sheets are at optimum temperature for such thermal processing. For example, in press bending, the glass sheet must be sufficiently soft to be shaped in a matter of seconds, yet must not be so soft that the covers of the press bending molds impress their configurations onto the glass surfaces to an extent sufficient to mar the optical properties of the shaped glass sheets.

The problem of adjusting the temperature is complicated by the fact that succeeding glass sheets must pass through at least a portion of the furnace where they are exposed to radiant heat sources whose output was adjusted to compensate for measured temperature differences of a preceding sheet. If this change in power input to the heating elements is made in response to each individual reading of temperature obtained for each glass sheet treated, the power input to the heating elements oscillates too rapidly between too high and too low and precise temperature control of the glass sheets at a processing station is lost.

When glass sheets are suspended from tongs for press bending, they are pressed between a pair of shaping molds, then chilled rapidly to impose a temper on the glass. Subsequently, the bent and tempered glass sheets are released from the tongs and deposited on a peg-type conveyor of the type disclosed in U.S. Pat. No. 3,412,841 to Paul Couch and Richard N. Pytel. After the sheets are cooled to handling temperature while supported on the peg-type conveyor for cooling, they are checked for proper curvature against a checking fixture. Those regions of the glass sheets that have been heated to too high a temperature will relax toward flatness during their cooling from the temperature at which they are tempered to handling temperature and will appear too flat compared to the checking fixture. Those regions of the glass sheet that have not been heated sufficiently will resist deformation while supported on the peg conveyor during cooling of the sheet to handling temperature. Such latter regions will appear to be overbent compared to the checking fixture. The present invention provides means to insure that different regions of the glass sheets are at their proper temperature on entering the press bending station so as to insure optimum compliance with curvatures required for each particular pattern when they cool to room temperature.

The prior art

The practice of monitoring glass temperature in the course of controlling the glass temperature during a glass processing operation is well known. For example, U.S. Pat. No. 3,915,638 to Poole provides a method and means to obtain instantaneous temperature measurement of glass articles, such as glass bottles and jars or similar glass containers manufactured on a mass production basis by means of blowing machines wherein gobs are fed successively to blank molds where they are primarily formed into individual blanks or parisons and then automatically transferred to blow molds where they are blown to final form, at any position on the machine and, more importantly, to determine the comparative temperatures substantially instantaneously. This patented invention resides in using and measuring infra-red radiation from the hot glass as an instantaneous indicator of glass temperature. Actual temperature measurements may be made anywhere in the forming cycle and, more importantly, a series of successive readings may be made at high speed to give accurate relative temperature differences along a glass body as it passes a given measuring point or zone.

An infra-red sensitive photo-tube is exposed to radiation from the hot glass bodies. The field of the tube is small so that definite positions on the glass bodies can be measured. The output of the photo tube, which is dependent on the temperature of the radiating hot glass, is amplified and fed into an oscilloscope and the output of the oscilloscope is a picture of a temperature versus length curve which appears on the face of the oscilloscope, and which curve is an instantaneous plot of temperature of the gob or parison along its length for the cycle measured. Accordingly, the practice patented by Poole requires an oscilloscope.

U.S. Pat. No. 3,146,344 to Palmer relates to measuring systems, and more particularly to means for determining the statistical deviation of measured values about a predetermined mean value, such as weight, density, and moisture content. The statistical deviation measuring device according to the patent includes an automatic control system for programming the sequence and duration of the measurements so that the measurements are very accurate and are taken under uniform measuring conditions so that the resulting deviation measurements indicated are reliable.

U.S. Pat. No. 3,372,017 to Pitbladdo covers a method and apparatus for automatically controlling mold and plunger temperatures in a free glass pressing process so that the glassware does not stick to the plunger when the plunger is removed from the mold. The mold temperature is controlled to maintain it within a desired operating range, and the plunger temperature is controlled as a function of the mold temperature to maintain the plunger temperature at a desired value lower than the mold temperature so that glassware does not stick to the plunger. The process function which determines the relative plunger temperature may be changed by adjusting function control to match the process of the character to the particular article being molded.

U.S. Pat. No. 1,619,729 to Howard provides for regulating the weight of mold charges delivered by a glass feeder in automatic response to the weight of glass articles processed from such mold charges. This result is accomplished by providing mechanics for periodically weighing certain articles after they are delivered from the shaping machine, and by providing other mechanics which automatically operates, if the article should be abnormally light or heavy, to increase or decrease the weight of the delivered mold charges. The apparatus is arranged to change the regulation of the feeder only when the permissible variation from standard weight is exceeded.

The invention patented by Howard automatically operates several control mechanisms, either simultaneously or in sequence. These control mechanisms actuate valves of gas burners which control the size of gas flames, or the opening provided by a glass control valve or adjustment of a sleeve surrounding a needle or plunger which is mounted to reciprocate above an outlet.

None of the prior art has provided an automatic control for the temperature of different glass sheet regions during the course of their thermal process incidental to press bending in the manner provided by the present invention.

SUMMARY OF THE INVENTION

The principal object of the present invention is to provide a glass temperature control system that maintains a desired glass temperature gradient in the glass sheets at an instant as close as possible to the subsequent processing step, such as press bending, without requiring any manual adjustment of either the conveyor speed or power input for the various heating elements. The glass temperature control system enables an operator to establish a series of set points that correspond to the desired glass temperature for different regions of the glass sheet so that the control system may automatically adjust the furnace heating element inputs to maintain the temperature at each of the glass sheet regions monitored at its desired temperature level without manual interference. Each set point is established when the glass sheet region corresponding to a region facing a series of controllable heating elements conforms to the desired shape for that region when the bent glass sheet is checked against a checking fixture after it is cooled. Each set point is subject to adjustment whenever the curvature in the corresponding glass sheet region departs from the tolerance limits established.

The control system provided by the present invention uses control elements available from electrical suppliers to monitor temperatures according to a repetitive cycle and to correct for any variation in temperature at any of the glass sheet regions undergoing surveillance automatically regardless of the source of the temperature variation. For example, if a reduction of plant line voltage causes reduction in the average level of power input to the furnace, the glass temperature control system senses a reduction in glass region temperature and automatically increases the power input to each adjustable heating element controlling each glass region so affected. Furthermore, when the operator decides to increase the rate of production by increasing the conveyor speed, the glass temperature control system of the present invention increases the power input to the heating elements irradiating the different glass sheet regions to adjust for a glass temperature reduction that normally results from a line speed increase.

The control system of the present invention measures the temperature of a representative region of each glass sheet as the latter leaves the furnace and enters the press bending station. Different regions of successive sheets are measured according to a recurring cycle of measurements.

The temperature of the region is compared to the desired temperature for that region and the control system adjusts the thermal input in a first control zone of the furnace inside the furnace in spaced relation to the furnace exit to enable successive glass sheets being processed to be subjected to more exact heating intensity for a sufficient duration so as to enable succeeding sheets to arrive at the temperature sensing station at a more exact temperature compared to the temperature desired for the glass sheet region as the glass sheet enters the processing station. The effect of changing the thermal output of any pair of heating elements in the first control zone on the temperature of the glass sheet regions other than the one directly facing the last region whose temperature is monitored is taken into account by using a recurring cycle of temperature measurements for different glass sheet regions and waiting for a cycle to be completed before making any change in power input in the first control zone. Then all changes in power inputs are made between successive measurement cycles. Heating elements subjected to automatic power input changes are spaced from the furnace exit to provide a soaking zone between the variable heating zone and the temperature measuring station.

In order to avoid erratic variations in power input to the heating elements that is an important cause of hunting, each region monitored has its temperature averaged with that of the corresponding region of two other glass sheets whose regional temperature was measured during the immediately past two recurring measurement cycles, and the average of three successive temperature readings for each region is used as a comparison with the desired temperature for that particular region to provide data to control the power input to the heating elements necessary to restore the temperature of any glass region to its desired value. Each other glass sheet region has its temperature monitored in turn, and the average of three last readings compared to the desired temperature to provide data for that particular region.

In order to insure that the heating elements in the furnace are able to attain a stable power input situation consistent with the set point temperature established for each glass sheet region in the minimum time possible, the furnace is provided with a second control zone. The power input to the heating elements of the second control zone is adjusted in response to changes in the inputs in the first control zone to compensate for any variation in power input required for the heating elements in the first control zone to obtain or re-obtain a desired value of the temperature in each region so that the power input to the corresponding heating element in the first control zone is permitted to return to a preexisting power input level. In such a situation, the heating elements in the first control zone cooperate to provide an extension of the soaking zone near the furnace exit. In addition, when needed, the heating elements in the first control zone have the maximum flexibility desired for both increase and decrease of power input within the limits of the power source available.

In processing glass sheets for press bending, it is important that the surface temperature be limited to a maximum such that the surface does not become marred readily on contact with the pressing molds. However, it is equally important that the glass interior be thoroughly soaked with heat to provide improved conditions for tempering the press bent glass. Hence, the soaking zone is made as long as practicable and only a relatively short portion of the furnace is made responsive to changes in glass region temperatures monitored. The prior art controlled the power input throughout the furnace length and considered it desirable to adjust the power input to the heaters near the furnace exit.

The various aspects of the present invention will be understood more clearly in the light of a description of a specific embodiment of the present invention as follows.

BRIEF DESCRIPTION OF THE DRAWINGS

In the drawings which form part of the present description and in which like reference numbers refer to like structural elements.

DESCRIPTION OF A PREFERRED EMBODIMENT

Figure 1:
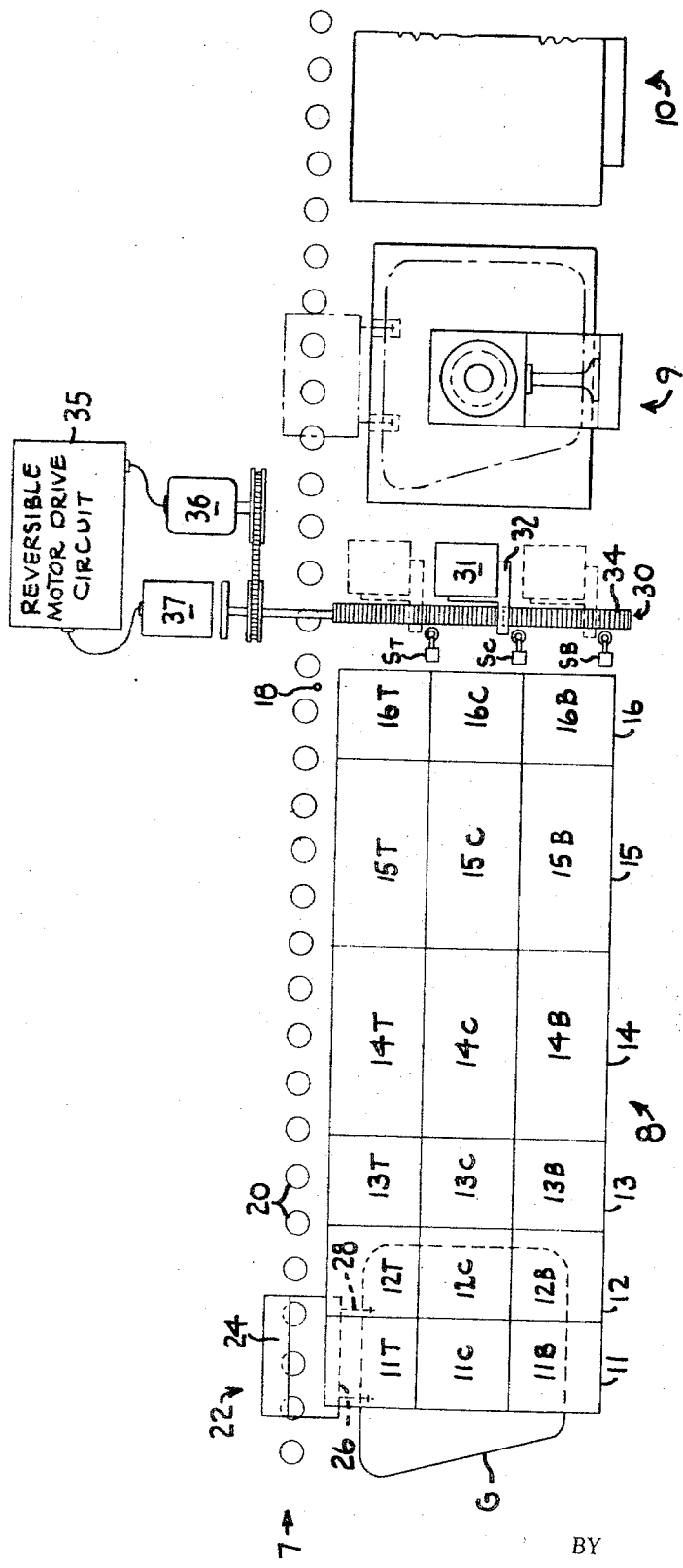
FIG. 1 is a schematic representation of an illustrative embodiment of a heating element control system and conveyor system for a typical heating furnace.

A preferred apparatus embodiment comprises a conveyor 7 extending through a furnace 8, a vertical press bending station 9, and a glass cooling station 10 in a horizontal plane above said furnace and said stations. The furnace is subdivided into six zones in the horizontal direction, with each zone comprising three sections arranged vertically one above the other. The zones are numbered consecutively from 11 to 16 starting at the cold end of the furnace and all the zones have a top section, such as 11T, 12T, etc., a center section 11C, 12C, etc., and a bottom section 11B, 12B, etc. Zones 14 and 15 are longer than the other furnace zones and are the control zones for the furnace. Furnace zones 11, 12, and 13 which are in end to end relation from the furnace entrance and furnace zone 16 adjacent the furnace exit are preadjusted zones, the heating elements of which need not be adjusted during a production run. According to one aspect of the present invention, only the heating elements in the control zones 14 and 15 are adjusted automatically in response to variations in temperature of different glass sheet regions compared to set point temperatures established for securing proper localized curvature for the bent glass.

Each of the furnace zone sections according to the prior art had a manually adjustable coil temperature controller. The illustrative embodiment of the present invention incorporates automatically controlled coil temperature controllers in zones 14 and 15 only. A first set of temperature controllers for controlling the input to the coils for heating the top, center and bottom sections for zone 15 is depicted as FTC, FCC and FBC (first top, center or bottom coil controllers) and a second set STC, SCC and SBC (second top, center or bottom coil controllers) depicted for zone 14 in FIG. 2. These temperature controllers are available commercially from Honeywell under the trade name Pyrotel.

Each heating element in each control zone comprises a heating coil and a coil temperature controller. Hereinafter, the letters F or S will refer to the first or second control zone 15 or 14, respectively, the letters T, C, or B refer to top, center or bottom section, and the final letter C refers to coil temperature controller in the three letter symbols that are used in the drawings.

Each controller is capable of actuating a motor M that repositions a potentiometer P whose output indicates the set point of the coil temperature controller which controls the input to the respective bank of heating elements for a particular furnace zone section 15T, 15C, 15B, 14T, 14C or 14B in a manner previously accomplished manually for all the furnace zone sections.

The press bending station 9 comprises a pair of mold members of complementary curvature and means responsive to the presence of a glass sheet therebetween to move the mold members into engagement against the opposite surfaces of a glass sheet softened to its deformation temperature while conveyed through the furnace for a desired holding time and then to retract the mold members. The cooling station 10 comprises a pair of plenum chambers having laterally spaced, opposing apertured walls through which tempering medium is imparted against or along the opposite major surfaces of the glass sheets while relative movement is provided between the glass sheets on one hand and the plenum chambers on the other hand.

The conveyor 7 comprises a series of conveyor rolls 20 extending transversely of a horizontal path of movement and spaced longitudinally of one another along said path. The conveyor comprises a series of longitudinal sections, each of which is individually controlled. The first conveyor section is arranged to convey a series of carriages 22 at a regulated speed so that glass sheets G suspended therefrom are transported through the furnace 8. A limit switch 18 is disposed near the exit end of the furnace for actuation by a carriage 22 to actuate a first timer circuit (not shown) that controls the operation of a clutch (not shown) that controls a transfer section of the conveyor 20 that transfers said carriage 22 supporting a glass sheet from the furnace 8 to the press bending station 9 and stops the transfer conveyor section when the glass sheet G is properly aligned at the station 9 for sufficient time to move the mold members inward into pressurized engagement against the opposite surfaces of the heat-softened glass sheet. The first timer circuit times out and a second timer circuit (also not shown) actuated by inward movement of the mold members controls the initiation of the retraction of the mold members and the operation of an overriding clutch that operates a transfer conveyor section to transfer the carriage 22 to the cooling station 10 in a manner well known in the art.

The carriages 22 are open frame members provided with upper runners 24 that ride over the rolls 20 of conveyor 7 by friction whenever the latter are rotated. The open frame carriages are provided with lower horizontal bar members 26 that support as many tongs 28 as are necessary to suspend a glass sheet G therefrom. The aforesaid structure is conventional and is described merely to provide background for the present invention.

According to a preferred embodiment of the invention, a temperature sensing station 30 is located immediately before the press bending station 9 and comprises a temperature sensing scanning mechanism SM comprising a pyrometer 31 carried on a threaded bracket 32 between positions defined by limit switches $S_T$, $S_C$, and $S_B$. A worm 34 is selectively rotated in response to actuation by reversible motor drive circuit 35 through a reversible motor 36 and a brake 37. A suitable system incorporates a pyrometer that is available commercially from Ircon, Inc., Niles, Ill., as Ircon radiation pyrometer #710.

In the description which follows, zone 15 is referred to as the first or temporary control zone and zone 14 is referred to as the second or permanent control zone because this is the order in which the control action is performed on these zones. Application of this control system to other press bending lines might utilize zones other than 15 and 14 as the first and second control zones depending upon the furnace configuration.

The control system will be described following the sequence in which the measurements and control actions are carried out. The drawings which are attached are subdivided functionally along these same lines. The dotted open area to the left of FIG. 2 encloses the average temperature error computer 100, the circuitry of which is used in the measurement of glass temperature and the determination of deviation of glass temperature from the desired glass temperature values. The dotted open area 200 in the center of FIG. 2 encloses the circuitry which uses the deviations in glass temperature from set point temperatures established for each glass region to adjust the set points of the first zone to be controlled (in this case zone 15) and shows also the means by which the deviation of the set points of the zone 15 heating element temperature controllers are computed to be used in the adjustment of the heating element temperature controllers in the second control zone (zone 14). The dotted open area 300 encloses the control circuitry which is used to modify the set points of the heating element temperature controllers in the second control zone 14 based on the deviation from the initial values in the first control zone 15. Each of these circuits and their major functions will be described in turn.

The average temperature computer 100 is coupled to a scanner mechanism (SM) with its three position limit switches ($S_t$, $S_c$, $S_b$) as shown in FIG. 1. The scanner mechanism used with the Ircon #710 radiation pyrometer conveys the optical pyrometer 31 successively to the three positions of the recurring cycle described above as required for the measurement of the temperatures of the top, center and bottom regions of the glass sheets as they enter the press bending station 9. The electrical output of the optical pyrometer is an input to a linearizer 42 whose function is to convert the output of a standard pyrometer into an electrical signal which is proportional to glass temperature. The linearizer output, which is proportional to glass temperature, is an input to a leading edge detector (LED) whose function is to initiate an electrical output when the leading edge of any glass sheet in the series undergoing processing enters the view of the optical pyrometer.

The output of the leading edge detector is connected through a time delay circuit D1 to reversible motor drive circuit 35 to command the scanning mechanism to move the pyrometer to the next viewing location after the temperature measurement has been made at the present location. In addition, the output of the leading edge detector is connected through an AND-gate 38 of the type sold by Bell and Howell as catalog number 19–513 through a time delay circuit D2 (parallel to time delay D1) to a glass sheet group counter capable of occupying three positions C1, C2 and C3, with means for switching the position of the sheet group counter when AND-gate 38 is actuated by time delay D2 and one of the limit switches, for example $S_c$. Thus, the glass sheet group counter advances on every third sheet whose regional temperature is measured when the scanning mechanism returns to the center position each time a cycle of three glass sheets passes in the view of the optical pyrometer.

The linearizer 42, which may be an Ircon model SC 710 BS, provides an output signal proportional to glass temperature, which is fed through a third time delay circuit D3 to produce a time delay signal $T_1$, $C_1$, or $B_1$ to nine additional AND-gates 40 disposed in parallel. Nine sample and hold circuits (S/H) are also provided. Each sample and hold circuit is available commercially from Bell and Howell as a Dynamic Response Module 19–407. Each AND-gate 40 is actuated by a different combination of time delay signals $T_1$, $C_1$, or $B_1$ with limit switches $S_t$, $S_c$ or $S_b$ and a group counter position C1, C2 or C3 to provide a gating signal for a corresponding sample and hold circuit S/H.

As each new glass sheet passes within the view of the optical pyrometer, one and only one of the sample and hold circuits is activated, namely the one in a circuit with the AND-gate 40 that is actuated by the top, center or bottom region reading obtained through a signal carried by a suitable circuit connection between each of the limit switches $S_t$, $S_c$ or $S_b$ to three parallel branches leading to three AND-gates 40 coupled to each of the aforesaid limit switches. Each signal output from the pyrometer 31 is adjusted by the linearizer 42 to be linearly related to temperature and is stored at the corresponding sample and hold circuit S/H as determined by the appropriate AND-gate. The time delay signals $T_1$, $C_1$ and $B_1$ are fed a predetermined time after the glass sheet leading edge has passed into view of the optical pyrometer.

It was shown that the glass sheet group counter was incremented after every third glass sheet. With the glass sheet group counter positioned at position C1, a temperature measurement is made and stored at the top, center and bottom regions of three successive glass sheets after which the glass sheet group counter is incremented to position C2 for three additional glass sheets, and so on. With the counter sequencing as follows, 1, 2, 3, 1, 2, 3, 1, 2, 3, etc., the regional temperatures of the preceding nine glass sheets are stored in the sample and hold circuits. By summing the three temperatures which were measured at the top regions of the glass sheets and dividing by 3, an average temperature at the top region of the glass sheets is obtained ($T_t$).

Similarly, by combining the three most recent measured values of temperature at the center region of the glass sheets, a center average temperature may be obtained ($T_c$) and by combining the three most recent values measured at the bottom region of the glass sheets, a bottom average temperature ($T_b$) may be obtained.

The temperature averaging desired above is obtained by coupling the outputs of the three sample and hold circuits S/H used to store the top region temperatures with a top region averaging circuit 50T, and making similar couplings between the center region sample and hold circuits with a center region averaging circuit 50C and between the bottom region sample and hold circuits and the bottom region averaging circuit 50B. Bell and Howell mode 19–301 adder/subtractor circuits are suitable for use as the averaging circuits.

The average temperature ($T_t$) measured at the top region of the glass sheets is compared with the desired set point tempearture ($SP_t$) for the top region of the glass sheets, the result of this computation is the deviation ($TE_t$) of measured temperature from the desired temperature in the top region of the sheets. Similarly, temperature deviations at the center region of the glass sheets ($TE_c$) and at the bottom region of the glass sheets ($TE_b$) may be calculated. These temperature deviations, or temperature errors, are to be utilized in the control of the first control zone 15 of the furnace 8. Additional adder/subtractor circuits 52T, 52C and 52B of the Bell and Howell 19–301 model are used to measure the difference between the output corresponding to those of the set point temperatures for the corresponding glass sheet regions and the output developed by the corresponding top, center and bottom temperature averaging circuits 50T, 50C and 50B, respectively. The temperature differences $TE_T$, $TE_C$ and $TE_B$, for the top, center and bottom regions are associated with present outputs that vary with the temperature differences determined for the respective set points.

The control circuit 200 for controlling the set points of the coil controllers in the first furnace control zone 15, namely FTC, FCC and FBC, comprises three parallel control circuits. These are coupled to the output of adder/subtractor circuits 52T, 52C and 52B, respectively, in a manner to be described in detail for the parallel circuit controlling the top section 15T of the first control zone 15. The output of adder/subtractor 52T is coupled to a corresponding first control circuit comprising comparing circuit 54T to provide one of three inputs to the latter. The other two inputs supplied to each comparing circuit 54T, 54C or 54B are obtained by coupling two branches from potentiometer P associated with temperature controller FTC, FCC or FBC, respectively, one branch feeding directly and the other through a sample and hold circuit S/H of the type provided in the average temperature error computer circuit 100. The signal through the sample and hold circuit S/H denotes the potentiometer signal conforming to a preestablished set point SPTM for the top region of the first control zone 15. The third signal bypasses the sample and hold circuit and feeds directly to comparing circuit 54T.

Each of the parallel control circuits in the first temperature controller circuit 200 includes a relay atcuator 60T, 60C or 60B that is actuated by limit switch $S_c$ to actuate a motor M that adjusts the set point on a coil temperature controller FTC, FCC or FBC, respectively in proportion to an error signal output $TE_t$, $TE_c$ or $TE_b$ from comparing circuit 52T, 52C or 52B. The resulting altered potentiometer signal for each parallel branch is fed to its corresponding comparing circuit 54T, 54C, or 54B together with the previous signal fed through the sample and hold circuit S/H in the corresponding parallel branch. The difference between the potentiometer signal stored in the appropriate sample and hold circuit and the altered potentiometer signal is compared to the corresponding temperature error signal that is the output of the corresponding adder/substractor circuit 52T, 52C, or 52B. The purpose of changing the potentiometer signals is to equate the compared differences of the two potentiometer signals to the signal associated with the respective temperature error $TE_t$, $TE_c$ or $TE_b$.

The potentiometer signal changes with the set point for its corresponding temperature controller. The difference in potentiometer output is a measure of the amount of change in temperature controller set point.

The control circuit 200 for the first control zone 15 also comprises a difference circuit 56T, 56C or 56B for each of its parallel control branches, respectively. The changed signal from the potentiometer P of each controller FTC, FCC and FBC, respectively is then fed into the corresponding difference circuit 56T, 56C or 56B, respectively and compared with the output from corresponding manually established set point controllers SPTM, SPCM and SPBM. The relay actuators 60T, 60C and 60B remain closed until after the set point on the temperature controllers FTC, FCC and FBC have reached their new control points and the outputs of difference circuits 56T, 56C and 56B are fed into the second control circuit 300.

The circuit 300 of the coil temperature controller system controls the automatic adjustment of the coil temperature controllers in the second control zone 14 of the furnace and comprises three parallel control circuits approximately identical to those in the first temperature control circuit 200 except for the omission of manual set point control circuits SPTM, SPCM and SPBM and the difference circuits 56T, 56C and 56B in the respective parallel control branches of circuit 200. The parallel control branches comprise comparing circuits 64T, 64C and 64B similar to 54T, 54C and 54B, relay actuators 70T, 70C and 70B similar to 60T, 60C and 60B, second temperature controllers STC, SCC and SBC, similar to FTC, FCC and FBC and motors M with potentiometer sensing elements P similar to those in control circuit 200.

After the glass temperature control circuit 200 which controls the first control zone 15 of the furnace has resulted in a new condition for the set points of the coil temperature controllers FTC, FCC and FBC, as determined by a suitable time delay, this part of the control system receives from the respective difference circuits 56T, 56C and 56B top, center and bottom section error signals (TSE, CSE, BSE) in comparing circuits 64T, 64C and 64B instead of the temperature error signals $TE_t$, $TE_c$ and $TE_b$ and uses these error signals to reposition the set points of the second coil temperature controllers STC, SCC and SBC, respectively, in the second control zone 14 of the furnace. The control logic for control of the second control zone is identical to the control logic for the control of the first control zone with the exception that the coil temperature controllers in the second control zone are repositioned by an amount proportional to the temperature set point errors TSE, CSE and BSE immediately previously determined for the coil temperature controllers FTC, FCC and FBC for the first control zone rather than by the measured temperature errors $TE_t$, $TE_c$ and $TE_b$.

When the coil temperature controllers STC, SCC and SBC for the second control zone change to a new set point, they automatically change the power input to the heating elements in the second control zone. Subsequent temperature measurement of glass sheet regions passing the field of vision of the pyrometer 31 reflect the change in power input for the heating elements in both control zones.

Figure 2:
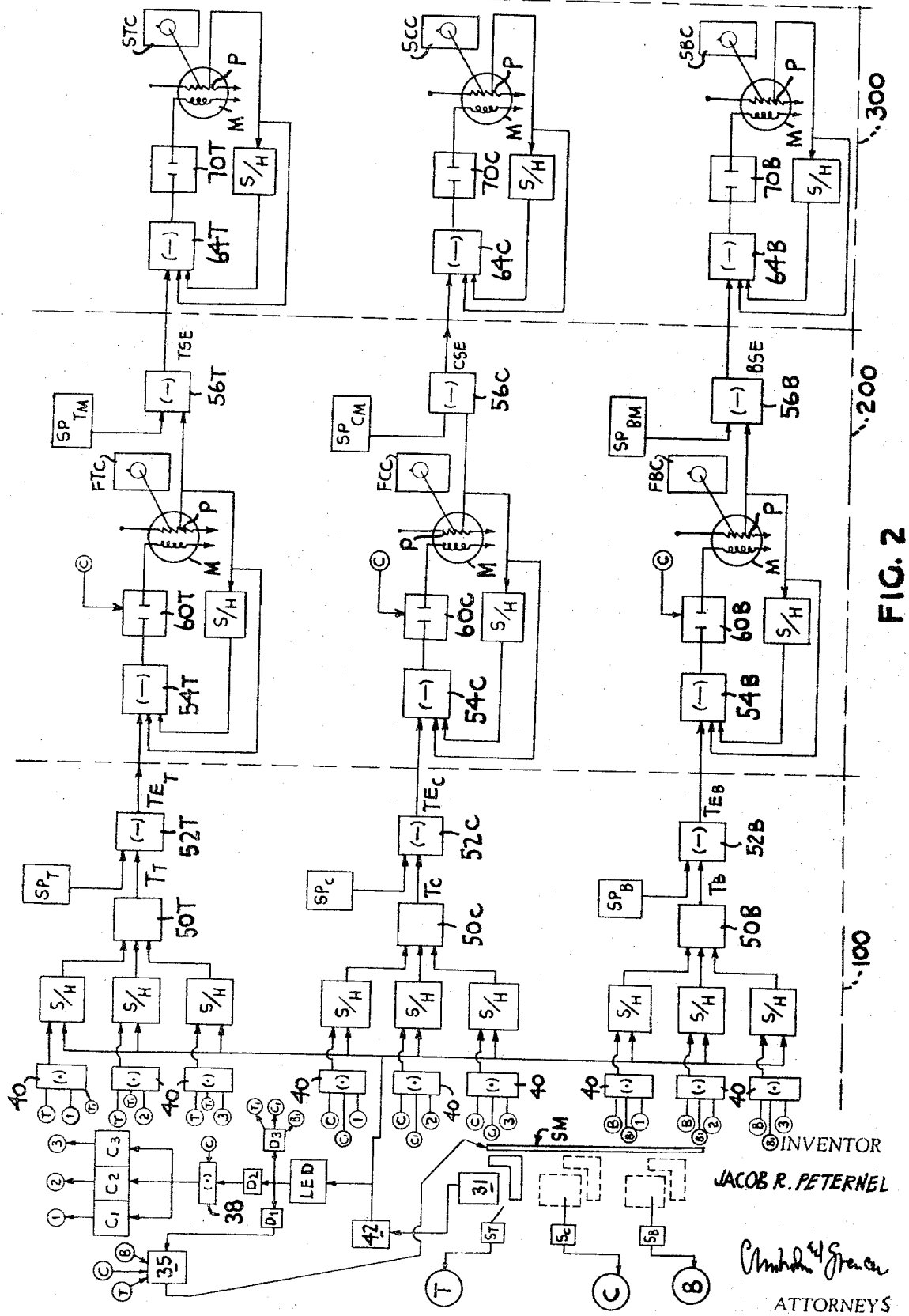
FIG. 2 is a schematic electrical circuit diagram of the control circuits used to control electrical input to the heating elements in the various control zones of the furnace in the typical embodiment of the present invention.

The schematic circuit diagram of FIG. 2 shows different relay actuators and comparing circuits for control circuits 200 and 300. It is understood that the two circuits do not necessarily need duplicate difference circuits and/or comparing circuits and/or sample and hold circuits and/or actuating circuits. A single actuating control may actuate both control circuits 200 and 300 sequentially through a timer between successive cycles of temperature measurement. In the alternative, the two circuits can be actuated on alternate cycles or one cycle can be postponed to begin after a new glass sheet after an end of a cycle passes in review of the pyrometer.

While the glass temperature control system has electrical power applied to it, the scanning mechanism and the control logic which supervise the measurement of glass temperature and the storage of the glass temperature for the previous nine plates is in full operation. When the cycle repeats, the appropriate top, center or bottom region signal cooperates with the appropriate group counter signal to erase the previous value stored in the corresponding sample and hold circuit S/H and replace it with a signal corresponding to the signal obtained from the new glass region monitored. The corresponding averaging circuit then measures the average of the new set of three and this new average value is compared to the set point for that region to determine a new temperature error $TE_t$, $TE_c$ or $TE_b$. The new averages are stored until the next cycle of measurements is completed and appropriate changes made in the set points for the respective temperature controllers as in the previous cycle, but based on up-to-date data signals.

The selection of zone 15 for control of glass temperature based on measured temperature deviation was based on the fact that the configuration of the furnace 8 is such that zone 15 is the zone which is nearest to the exit of the furnace and yet sufficiently distant from the exit that a significant effect of a change in heating element temperature could be expected to change glass temperature in the shortest period of time. Selection of zone 14 as the zone to assist zone 15 in the control of glass temperature was made based on the fact that it is adjacent the first control zone and is the other relatively long furnace zone, which increases the effect on the glass temperature of a change in heater element input over that which would be obtained if a shorter zone were controlled.

The other furnace zones 11, 12 and 13 before the control zones and the zone 16 beyond the control zones along the path of the conveyor through the furnace 8 are preset to serve as glass heating zones and, while the heating elements in the heating zones are capable of manual adjustment of thermal output, efficient operation dictates that the heating elements in the heating zones be preset at the beginning of any campaign to produce a particular pattern and not be changed during the campaign.

The heat capacity of the furnace is considerably greater than that of the series of glass sheets passing through the furnace at any moment. Should the heating elements near the furnace exit (instead of those spaced from the furnace exit as presently proposed) be adjusted automatically in response to any regional temperature deviation recorded, soaking would be less likely to occur and there is a possibility that individual glass sheets from time to time would be insufficiently soaked with the amount of heat required for further thermal processing.

The concept of storing the temperature deviations for a complete cycle of temperature readings for all regions monitored and then correcting the input to all of the heating elements in a furnace control zone in the time interval between successive cycles, preferably simultaneously rather than correcting the heating input only to the heating elements in facing relation to the region measured after each temperature measurement is made, tends to reduce variations in the temperatures of the glass sheet regions other than any one region directly facing an automatically adjustable heating element in response to a change in energy input to the heating elements facing the last region whose temperature was determined. The interaction resulting from individual adjustments in the heating elements of the different sections of each control zone causes a more frequent need to change the input to the heating elements facing any particular glass region. Each change in heat output from the heating elements facing any one glass region is likely to cause an overreaction on the temperature effect on the glass sheet regions other than the one facing the heating elements in question corrected for a temperature deviation from a desired temperature when each individual temperature determination is used as the basis for reducing a regional temperature deviation. A simultaneous adjustment of all the temperature controllers following each cycle simultaneously corrects the interaction effects of each heating element on all the regions whose temperature is monitored. A single sequential adjustment of heating element inputs between each cycle of readings rather than after every individual temperature reading, while not as desirable as simultaneous adjustment after each cycle, is preferred over adjustment in power input after each temperature determination.

Comparing the average of the last three temperature readings for each region monitored to the temperature desired for the region in question lessens the effect of any unusually different glass sheet in the series to automatically adjust the power input to the corresponding heating element unduly. Hence, variations in the heat output from said heating element resulting from adjustments in the power input are reduced. This reduction in heat output variation reduces the tendency of temperature variations to swing or hunt for each region.

The form of the invention shown and described herein represents an illustrative preferred embodiment. It is understood that various changes may be made, such as varying the number of regions monitored in each cycle or averaging a different number of corresponding readings for each region whose average is compared to the desired temperature reading for that cycle without departing from the spirit of the invention as defined in the claimed subject matter that follows.

I claim:

1. In the art of heat treating glass sheets on a mass production basis wherein a series of glass sheets is heated to an elevated temperature while conveyed within an enclosed atmosphere with different glass sheet regions facing heating elements each of whose heat output is responsive to an adjustable power input supplied to said heating element and treated outside said enclosed atmosphere before said glass sheets cool to below an elevated temperature suitable for said treatment, the improvement comprising
    (1) determining the temperature of a selected region of each glass sheet whose temperature is to be determined in a set of successive glass sheets in said series as said glass sheet leaves said enclosed atmosphere according to a recurring cycle of temperature determinations,
    (2) averaging data indicating the temperatures determined for each of said different regions during several successive cycles including the most recent of said temperature determinations,
    (3) determining the temperature difference between the average temperature determined for each of said regions and a desired temperature for said region,
    (4) storing data indicating said temperature differences so determined for each of said glass sheet regions whose determined average temperature varies from said desired temperature until one of said recurring cycles is completed, and
    (5) changing the power input supplied to each of said heating elements whose heat output is responsive to said power input and facing a region for which data indicating a said temperature difference is stored between the end of one of said cycles and the beginning of the next of said cycles in such a direction as to reduce any temperatire differences indicated.

2. The method as in claim 1, wherein the temperature is determined of a different region of each successive glass sheet whose temperature is determined.

3. Apparatus for heating glass sheets including a furnace comprising a plurality of heating zones disposed in end-to-end relation from an entrance to an exit of said furnace and a plurality of heating sections in each of said heating zones, each facing a different region of said glass sheets,
    a control zone within said furnace having controllable heating elements in each of its respective sections,
    temperature sensing means disposed outside the furnace adjacent said exit and movable between positions facing different regions of said sheets to be sensed,
    set point control means for establishing a desired temperature at different regions of glass sheets passing said temperature sensing means,
    means to focus said temperature sensing means on said different regions of successive glass sheets according to a repetitive cycle,
    means to store data for each said region indicative of the difference between the observed temperature and said desired temperature for each said region,
    and means to change the power input of said controllable heating elements in each of said sections of said control zone between repetitive cycles.

4. Apparatus as in claim 3, further including means to average the data corresponding to each of a plurality of recent temperature readings for each region.

5. The improvement as in claim 1, wherein said input changes are made simultaneously between successive cycles.

6. The improvement as in claim 1, wherein said glass sheets are conveyed past a series of preset heating elements both immediately before and immediately after conveying said glass sheets in facing relation to said automatically adjustable power input responsive heating elements, whereby said glass sheets are soaked with heat radiated from said preset heating elements both prior to and after their exposure to said automatically adjustable power input responsive heating elements.

7. The improvement as in claim 1, further including the steps of additionally exposing each of said glass sheet regions to an additional heating element whose heat output is responsive to an automatically adjustable power input supplied to said additional heating element during said heating in said enclosed atmosphere, storing data indicating changes in power input supplied to each of said first named heating elements between successive cycles and changing the power input to each of said additional heating elements in an amount and direction sufficient to change the power input to said first named heating element facing each of said glass sheet regions toward its previous level.

8. The improvement as in claim 1, wherein said glass sheets are shaped to a desired curvature and cooled while treated outside said enclosed atmosphere, further including the steps of matching the shape of said sheets after they are cooled to a temperature suitable for handling to a desired contour, and adjusting said desired temperature for each of said glass sheet regions in response to any deviation in shape greater than acceptable tolerance detected for said region.

9. The improvement as in claim 8, wherein the temperature of three different regions of three successive glass sheets is determined in each cycle and the temperatures determined for each region during three successive cycles of measurement is averaged to provide an average temperature for comparison with a temperature desired for each of said regions.

10. The improvement of claim 1, wherein a single temperature sensing means is focused on a different region of each successive glass sheet according to said recurring cycle to determine the temperature for each said region.

References Cited

UNITED STATES PATENTS

| 3,257,188 | 6/1966 | Morgan et al. | 65—107 X |
|---|---|---|---|
| 3,508,899 | 4/1970 | Ward | 65—162 X |
| 3,191,857 | 6/1965 | Galey et al. | 65—160 X |
| 3,246,124 | 4/1966 | Trethewey | 65—162 X |

FOREIGN PATENTS

| 205,170 | 1/1957 | Australia | 65—107 |

ARTHUR D. KELLOGG, Primary Examiner

U.S. Cl. X.R.

65—106, 162, 118